United States Patent [19]

Fahrion

[11] Patent Number: 4,941,563
[45] Date of Patent: Jul. 17, 1990

[54] CONVEYING DEVICE

[76] Inventor: Otmar Fahrion, Dürerstr. 9, D-7014 Kornwestheim, Fed. Rep. of Germany

[21] Appl. No.: 327,920

[22] PCT Filed: Sep. 28, 1987

[86] PCT No.: PCT/EP87/00551

§ 371 Date: Jan. 25, 1989

§ 102(e) Date: Jan. 25, 1989

[87] PCT Pub. No.: WO88/02345

PCT Pub. Date: Apr. 7, 1988

[30] Foreign Application Priority Data

Oct. 3, 1986 [DE] Fed. Rep. of Germany ....... 3633702

[51] Int. Cl.$^5$ .......................................... B65G 37/00
[52] U.S. Cl. ................... 198/465.3; 198/803.2
[58] Field of Search .............. 198/465.2, 465.3, 803.2; 29/33 P

[56] References Cited

U.S. PATENT DOCUMENTS

| | | | |
|---|---|---|---|
| 3,690,433 | 9/1972 | Buldini | 198/465.3 |
| 3,724,052 | 4/1973 | Graham et al. | 198/465.3 |
| 3,929,079 | 12/1975 | Eliassen . | |
| 4,256,221 | 3/1981 | Lain | 198/465.3 |
| 4,699,266 | 10/1987 | Weiss | 198/465.3 |
| 4,757,893 | 7/1988 | Shabram et al. | 198/803.2 |

FOREIGN PATENT DOCUMENTS

| | | | |
|---|---|---|---|
| 1756438 | 4/1970 | Fed. Rep. of Germany . | |
| 1811986 | 6/1970 | Fed. Rep. of Germany . | |
| 2253632 | 5/1974 | Fed. Rep. of Germany ... | 198/465.3 |
| 2269440 | 11/1975 | France . | |
| 869900 | 6/1961 | United Kingdom . | |

*Primary Examiner*—Joseph E. Valenza
*Attorney, Agent, or Firm*—Fred Philpitt

[57] ABSTRACT

In order to be able to move pellets (10) in different sections of a conveying path at different speeds on chain conveyors (14, 16), without having to use step-by-step transmissions, it is proposed to place the pellets on at least two chain conveyors (14, 16), which travel at different speeds. By controlling the frictional resistance between the contact members (22 to 28) of the pellets (10) and the endless conveyors (14 and 16), it is possible to determine by which of the chain conveyors the pellet is respectively moved in synchronism, whereas a substantially power-free relative movement is possible between the pellet (10) and the other chain conveyor. The last-mentioned chain conveyor then serves momentarily solely for the vertical support of one side of the pallet.

24 Claims, 9 Drawing Sheets

CONVEYING DEVICE

DESCRIPTION

The invention relates to a conveying device for pallets.

A conveying device of this type is disclosed in GB-A No. 869 900. In the latter, the conveying speed of the pallets can be changed at certain sections of the conveying path. For this purpose, two chain conveyors driven at different speeds are provided, whereof one, which travels at the basic speed, extends over the entire conveying path, whereas the second, which travels at the higher speed, is provided solely in short acceleration sections. This second conveyor can be raised by hydraulic cylinders, so that it then lifts the pallets from the first conveyor and continues to move them at its higher speed.

This known conveying device is mechanically complicated and is not suitable for flexible use on variable production lines, since the points at which the speed variation takes place, cannot be re-programmed at little expenditure.

Conveying devices are also known which have two conveying chains extending parallel to each other, in which yoke-like support caps are fitted on the individual chain links so that their upper sides form a smooth, continuous conveying surface. The feet of pallets are seated on these conveying surfaces under the weight of the pallet and are entrained by frictional resistance. If the pallet strikes against an obstacle, for example the end of a queue of pallets waiting in front of a processing station, the conveying chains may slide through under the feet of the pallets. Since the working stations set up on production lines provided with such conveying devices contain very expensive processing machines, however the travelling speed of the endless conveyors must take into account the processing time of the work-pieces in a station, it has already been proposed to reduce the unprofitable feed times of the working stations due to the fact that the pallets are drawn into the working stations and pushed out of them quickly by a separate driving device. Auxiliary conveying devices of this type comprise for example Maltese-cross transmissions or similar step-by-step transmissions, their output part acting directly on the pallet. In the case of pallet dimensions which are large in practice, corresponding step-by-step transmissions in turn have large dimensions; therefore, in small working stations or when the pallets are conveyed close to the ground, they can only be located with difficulty below the conveying plane. The maintenance of these poorly accessible step-by-step transmissions is correspondingly complicated; also, in such working stations, in which metal is removed by cutting, there is a danger that chips enter the step-by-step transmissions and damage them.

The present invention intends to provide a conveying device which makes it possible to draw pallets into a working station at a speed which is greatly increased with respect to the basic conveying speed, the points of the conveying path, at which variations of speed are intended to take place, being able to be re-programmed in a simple manner.

This object is achieved according to the invention by a conveying device as described hereafter.

In the conveying device according to the invention, at least two endless conveyors travel continuously at different speeds. These endless conveyors both have a substantially closed conveying surface, thus are protected from metal chips. Seated on these conveying surfaces are the contact members of pallets, the frictional connection between the contact members and the conveying surfaces being controllable. In this way, a pallet in question can be connected optionally to an endless conveyor travelling more quickly or to an endless conveyor travelling more slowly. The masses to be accelerated or decelerated when changing the connection result solely from the pallet and the work-piece carried by the latter, whereas in step-by-step transmissions, additional masses in the transmission itself must be accelerated and decelerated. The conveying device according to the invention may also have a very low construction and no parts which are mechanically complicated and require servicing are located in the region of the working stations. Since the conveying device also contains no parts which travel to and fro quickly, the danger of an accident is considerably reduced. Finally, in the conveying device according to the invention, the ratio between the higher and lower conveying speed can be altered simply in that the drives for the two endless conveyors are allowed to operate at different speeds.

With the development of the invention according to another embodiment on the one hand only a very low residual power transmission in the inoperative position of the contact members and only a small adjusting force for changing the contact members between the working and inoperative position is guaranteed.

According to another embodiment, the mechanical power which is required for adjusting the contact members between the working and inoperative position, is tapped mechanically from the movement of the endless conveyor. The individual pallets thus do not require any power reservoir such as batteries, which would be maintenance-intensive.

With the development of the invention according to another embodiment it is ensured that the deriving of the adjusting power for the contact members is maintained even at the time of transfer from a first rectilinear conveying section to a second conveying section inclined at an angle of 90° thereto.

According to another embodiment, it is recognised automatically whether the pallet is moved in the direction of the main axis of the pallet or in the direction of the secondary axis of the pallet. The contact members located one behind the other in the instantaneous conveying direction are automatically combined as a jointly controlled pair.

In a conveying device according to another embodiment, even the electrical supply voltage, which is required for operating electronic circuits of the power flow control, can be derived from the relative movement of the two endless conveyors with respect to each other. In this case, additional, small, maintenance-free storage batteries can be used, which are charged by the voltage generator and serve both for smoothing the voltage as well as for the rapid re-starting of the control after a complete stoppage of the endless conveyors.

With the development of the invention according to another embodiment, it is ensured that pallets do not bump against each other at high speed, preferably when, if they bang against the end of a waiting queue or an obstacle, the frictional connection to both endless conveyors is completely cancelled.

With the development of the invention according to another embodiment it is possible to accelerate or decelerate individual pallets even at those points of the conveying path which are normally travelled at basic speed. In this way, irregularities in the pallet distribution of the conveying apparatus caused by disturbances can quickly be dealt with without measures pertaining to an apparatus, starting from a central control computer.

With the development of the invention according to another embodiment it is ensured that the frictional connection between the high speed endless conveyors and the pallets is particularly good, since in this case double the contact surface is available. In addition, due to the symmetrical supply of power to the pallet it is ensured that no torques are exerted on the pallet with regard to its major axis, if a modification of the pallet speed is brought about.

The development of the invention according to another embodiment makes it possible to draw processing stations directly up to the edge of a pallet. This development is also advantageous with regard to smooth-faced, outer boundary surfaces of the moving pallets.

A conveying device according to another embodiment is particularly suitable if a large number of pallets is to be conveyed on a path, on which the speed must be changed solely at a few points. One thus has mechanically, particularly robust and economical pallets.

With the development according to another embodiment, it is ensured that the endless conveyors have a smooth, continuous surface, on which the pallets are entrained and smooth, continuous side faces, which are well-suited for guidance on stationary plates.

The invention will be described in detail hereafter by means of embodiments, with reference to the drawings, in which.

Figure 1:
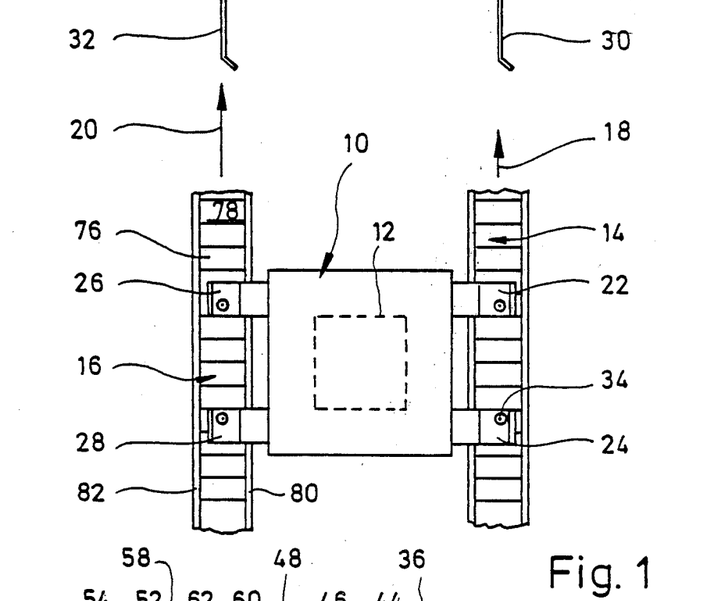
FIG. 1 is a diagrammatic plan view of a pallet and a cutaway view of two chain conveyors, by which the pallet can be moved at different speeds.

FIG. 1 shows a pallet 10, which carries a work-piece 12 indicated by broken line through various processing stations which are not shown. Provided for moving the pallet 10 is a first chain conveyor 14 and a second chain conveyor 16, the chain conveyor 16 travelling faster than the chain conveyor 14, as indicated by the length of arrows 18, 20.

On its right-hand side, the pallet 10 has two contact members 22, 24, on its left-hand side it has two contact members 26, 28. Firstly the contact members 22 to 28 transmit the weight of the pallet 10 and work-piece 12 to the chain conveyors 14 and 16 and at the same time produce a controllable frictional resistance entrainment connection between the pallet 10 and respectively one of the chain conveyors 14 and 16. The control of the frictional resistance between the pallet and chain conveyors will be described in more detail hereafter. Roughly speaking, this control works such that if the pallet 10 is to be moved at low speed, a frictional resistance to the chain conveyor 14 is produced by the contact members 22 and 24, whereas the contact members 26 and 28 terminate the frictional resistance to the chain conveyor 16. The pallet 10 is then moved with the chain conveyor 14, whereas the chain conveyor 16 may move beneath the contact members 26, 28, thus momentarily has solely a vertical supporting function. On the other hand, if the pallet 10 is to be moved quickly, the frictional resistance between the contact members 26, 28 and the chain conveyor 16 is established, whereas the frictional resistance between the contact members 22, 24 and the chain conveyor 14 is terminated, so that the contact members 22, 24 may travel over the chain conveyor 14, which now in turn has solely a supporting function.

Controlling the establishing and termination of the frictional resistance between the various contact members and the chain conveyors is carried out by actuating members integral with the frame, for example cam rails 30 and 32 shown in FIG. 1, which co-operate with cam-follower rollers 34 of the individual contact members 22, 24. For the simultaneous actuation of the cam-follower rollers 34 disposed on one side of the pallet 10, the corresponding cam rails 30, 32 and the cam-follower rollers 34 of the contact members may be disposed in different planes, the cam rails 30, 32 being located at the spacing of cam-follower rollers 34 located one behind the other. Instead of this, the control members of the various contact members can also be connected mechanically, so that only a single cam-follower roller 34 is necessary.

Figure 2:
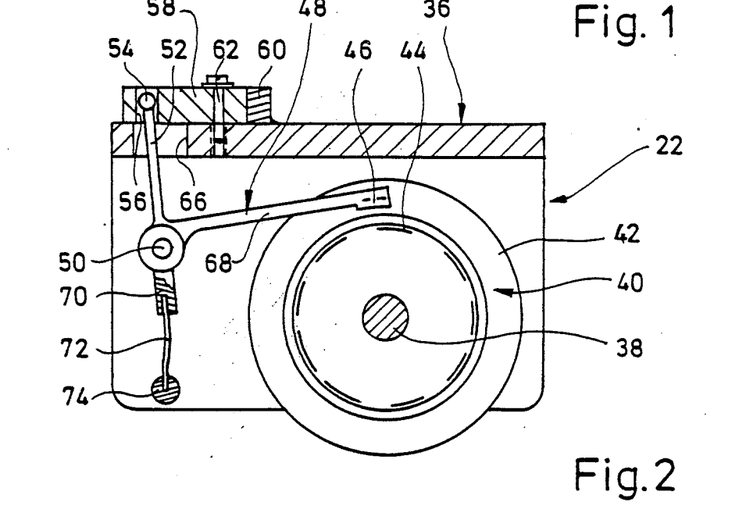
FIG. 2 is a vertical section through one of the contact members of the pallet shown in FIG. 1.
Figure 3:
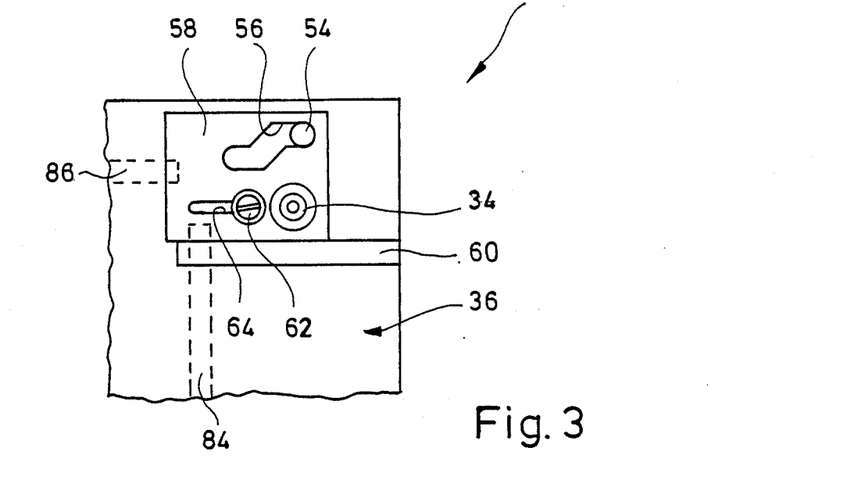
FIG. 3 is a plan view of a corner of the contact member according to FIG. 2.

FIGS. 2 and 3 show a first embodiment for one of the contact members.

The contact member has a yoke-like frame 36, fastened in the sides of which is an axle 38. A wheel 40 with a tire 42 made from hard rubber travels thereon. Connected in a nonrotary manner to the wheel 40 is a toothed rim 44, which cooperates with a toothed segment 46. The latter is supported by the free end of a bent brake lever 48, which is mounted on a pin 50 supported by the frame 36. The brake lever 48 has an actuating arm 52, whereof the spherical end forms a cam-follower member 54, which travels in a cam slot 56. The latter is reamed out of an actuating slide 58, which due to a guide bar 60, a guide screw 62 and a guide slot 64 is arranged to slide in the transverse direction on the frame 36. The cam slot 56 has the shape illustrated in FIG. 3 and lying below it, the upper wall of the frame 36 is provided with an opening 66, whose inside width is greater than the stroke of the cam slot 56. The actuating arm 52 of the brake lever 48 is guided through the opening 66.

As can be seen from FIG. 2, the position of the pin 50 is chosen so that the driven arm 68 of the brake lever 48 extends substantially tangentially to the gear rim 44, if the brake formed by the toothed rim 44 and toothed segment 46 is engaged.

The brake lever 48 also comprises a third lever arm 70, which is constructed as a spring seat for a leaf spring 72. The other end of the leaf spring 72 is fixed in a spring seat 74 integral with the frame, the position of which is again chosen so that when the brake lever 48 is disengaged and when the brake lever 48 is engaged, the leaf spring 72 is deflected in opposite directions by the same amounts from a central, unstable position.

The contact member shown in FIGS. 2 and 3 then transmits no forces from the chain conveyor located therebelow to the pallet 10, when the brake lever 48 is in the inoperative position shown in FIG. 2. A contact member may then ride unhindered over a chain conveyor travelling more slowly or overtake by way of a faster chain conveyor.

In order to facilitate such a relative movement between the contact member and chain conveyor with low force, the chain conveyors have cuboid-shaped support caps 76, which are fitted to the actual link chain. The upper sides of the individual support caps 76 form a smooth, continuous conveying surface 78. Provided at the side of the support caps 76 are side plates 80, 82 respectively, which together with the support caps 76 form a complete encapsulation of the link chain of the chain conveyors. The side plates 80, 82 may be extended upwards somewhat above the conveying surface 78, so that at the same time they form a lateral guide for the contact members 22. Such a lateral guide is sufficient for conveying pallets between the individual working stations, since in the working stations themselves, the pallets are aligned exactly with respect to the tools by separate positioning means.

In the modification of the embodiment illustrated in FIG. 3, the actuating slides 58 of the various contact members can be connected to each other by rods 84 extending parallel to the conveying direction and transverse rods 86, so that the brakes of contact members located one behind the other in the conveying direction are engaged or disengaged simultaneously under the brakes of contact members lying one beside the other are necessarily actuated in phase opposition.

Figure 4:
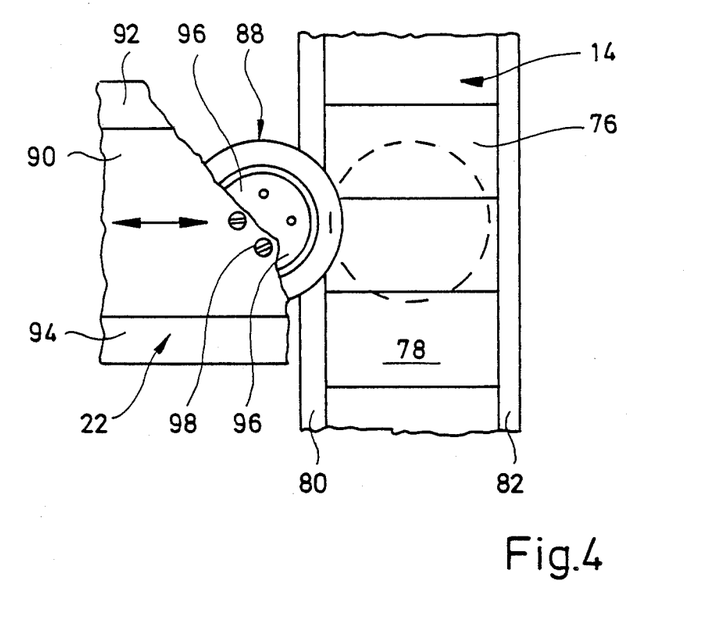
FIG. 4 is a diagrammatic plan view of a modified contact member for use in the pallet according to FIG. 1.

In the modified contact member shown in FIG. 4, a wheel 88 is arranged to rotate about an axle located perpendicularly to the conveying surface 78 on a wheel support able to move transversely to the conveying direction. The wheel support is guided between two lateral guide bars 92, 94. The wheel 88 is seated on an axle stub 96 having a large diameter, which is fastened by means of screws 98 to the wheel support 90. The lower end face of the axle stub 96 in FIG. 4 aligns with the lower end face of the wheel 88.

If the wheel support 90 is in the position shown in FIG. 4, then the wheel 88 runs with slight transverse slipping on the conveying surface 78, with respect to the conveying direction of the chain conveyor. No appreciable force is exerted on the pallet by the chain conveyor, in this position of the wheel. On the other hand, if the wheel support 90 in FIG. 4 is moved towards the right, until the wheel 88 lies completely on the chain conveyor (shown in broken lines), then the wheel 88 can no longer rotate and is entrained by the chain conveyer by frictional resistance. Under these conditions, there is thus high frictional resistance between the conveying surface 78 of the chain conveyor (14) in question and the pallet 10 and as long as it does not strike against an obstacle, the pallet 10 is moved along with the chain conveyor 14, since in the position of the wheel 88 of the contact member 22 shown in broken line in FIG. 4, the corresponding wheel of the contact member 26 runs solely with the edge on the chain conveyor 16, geometry which is a mirror image of that in FIG. 4 being provided in detail. It will be understood that with the type of contact member illustrated in FIG. 4, the inner side plates 80 end below the conveying surface 78. However, they are still in contact with the inner sides of the support caps 76 and thus ensure sealing of the link chain of the chain conveyor. This condition must also be fulfilled in the modified contact members according to FIGS. 5 and 6.

Figure 5:
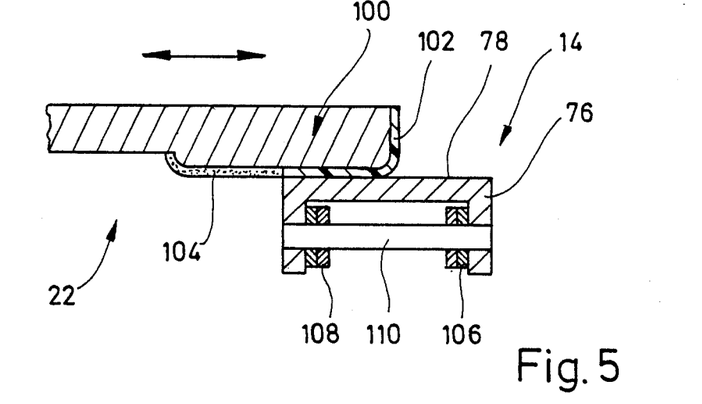
FIG. 5 is a vertical section through a further modified contact member.

Belonging to the contact member illustrated in FIG. 5 is a shoe 100 able to move transversely to the chain conveyor, whereof the under side supports a low friction covering 102 and a high friction covering 104. The dividing line between these two coverings extends parallel to the conveying direction. The surfaces of the two coverings 102 and 104 pass smoothly and steadily one into the other, so that the shoe 100 can be moved towards the right without lifting the pallet 10 out of the sliding position shown in FIG. 5, in order to bring the high friction covering 104 increasingly onto the conveying surface 78. With the movement of the shoe 100 towards the right, increasing frictional resistance between the conveying surface 78 and the shoes 100 and thus the pallet 10 is produced.

In FIG. 5, in order to illustrate the internal construction of the chain conveyor, outer joint plates 106, inner joint plates 108 and joint pins 110 of the link chain are shown.

Figure 6:
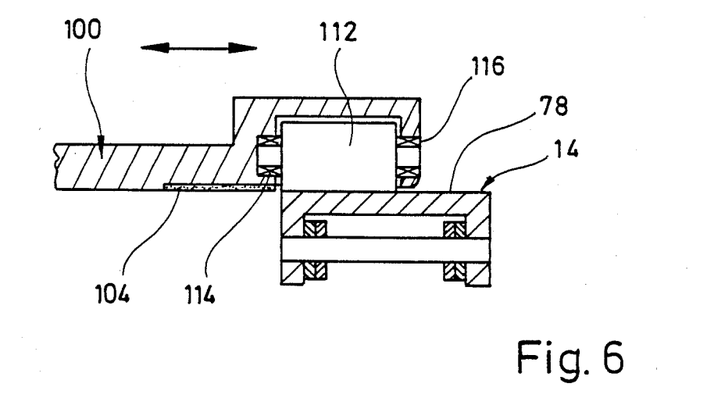
FIG. 6 is a similar view to FIG. 5, however in which a further modified contact member is shown.

In the modified contact member according to FIG. 6, the low friction covering 102 of FIG. 5 is replaced by a roller 112, which is mounted to rotate in bearings 114, 116 of the shoe 100 about an axis perpendicular to the conveying direction. The lowest position of the roller 112 in FIG. 6 coincides with the surface of the high friction covering 104.

Figure 7:
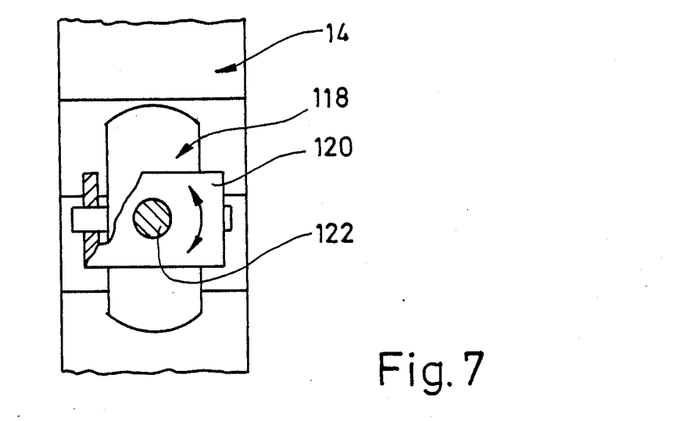
FIG. 7 is a plan view of a wheel able to rotate about a vertical axis, which represents part of a further modified contact member.

A wheel 118 is also used in the modified contact member shown in FIG. 7, in order to facilitate a force-free relative movement between the chain conveyor and contact member. In this respect, similar conditions exist as in the contact member according to FIG. 2. However, whereas in the latter, the wheel 40 is braked firmly to achieve frictional resistance between the chain conveyor and contact member, the wheel 118 of the contact member according to FIG. 7 is rotated through 90° out of the position shown in FIG. 7 in order to introduce frictional resistance, so that the axis of the wheel extends parallel to the conveying direction. Then, the wheel 118 can no longer roll and the contact member is entrained by the chain conveyor.

In order to facilitate this rotation of the wheel 118 about an axis arranged perpendicularly to the conveying surface 78, the wheel is located in a bearing bracket 120, which supports a vertical pivot pin 122. The latter is mounted in the frame of the contact member (not shown in detail) and is rotated by a servo motor which is also not shown in detail. When using the contact member shown in FIG. 7, additional lateral guide means for the pallet 10 are preferably used, for example pairs of rollers, which run on the two side faces of one of the side plates 80, 82.

Figure 8:
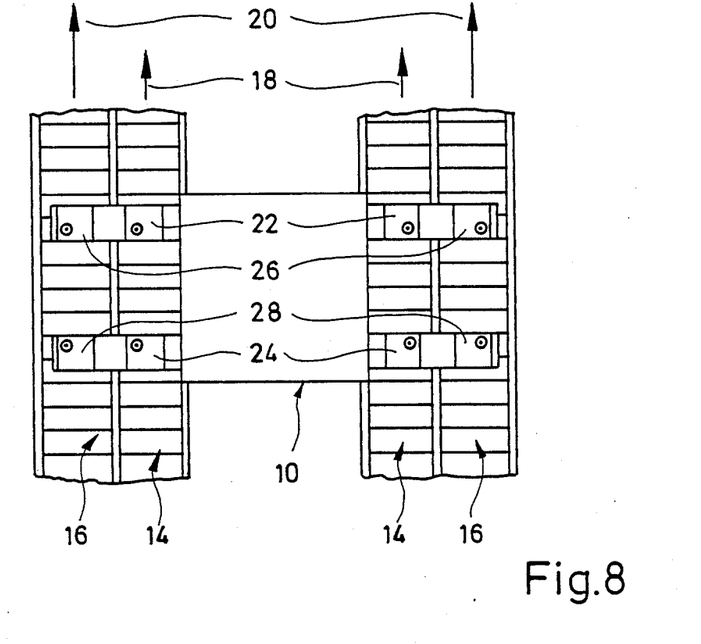
FIG. 8 is an illustration similar to FIG. 1, but in which two pairs of chain conveyors are provided for adjusting the various speeds of the pallet.

As shown in FIG. 8, one can also provide two low speed chain conveyors 14 and two high speed chain conveyors 16 and accordingly also double the number of contact members 22 to 28. One thus has symmetrical force-transfer conditions, i.e. torques on the pallet 10 about its major axis do not occur.

Figure 9:
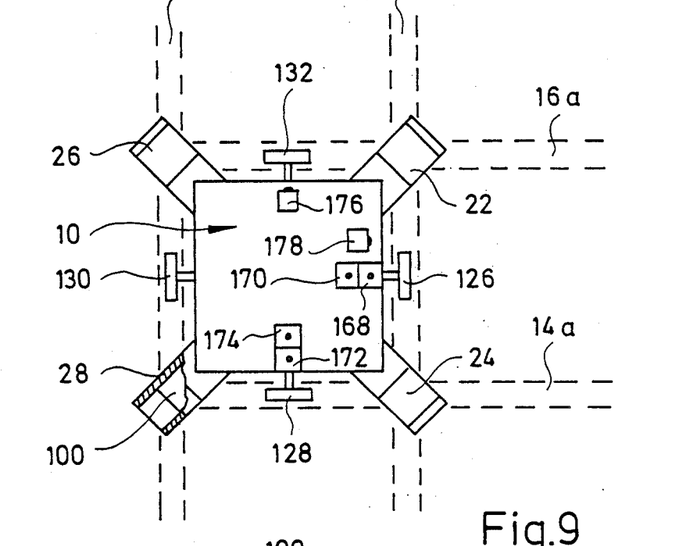
FIG. 9 is a plan view of a modified pallet, which is able to move on conveying paths having right-angled intersections.
Figure 10:
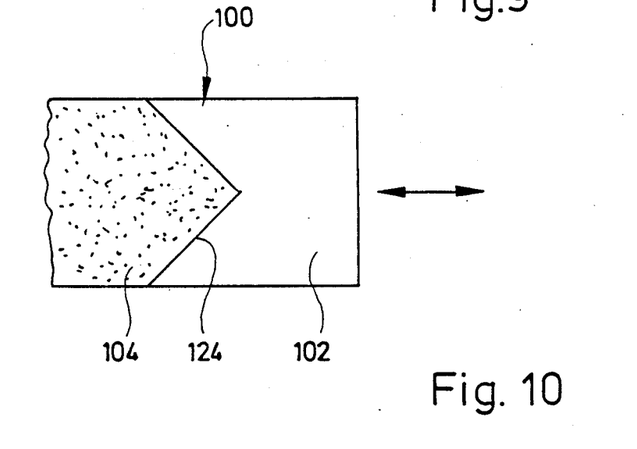
FIG. 10 is a plan view of the under side of a shoe of the contact members of the pallet according to FIG. 9.

FIG. 9 shows a chain conveyor arrangement with chain conveyors 14 and 16 similar to FIG. 1 and chain conveyors 14a and 16a extending perpendicularly thereto. The pallet 10 now supports the four contact members 22 to 28 in diagonal alignment, the individual contact members having a similar construction to that illustrated in FIG. 5. However, as shown in FIG. 10, the separating line 124 between the low friction covering 102 and the high friction covering 104 is bent at right angles, thus lying symmetrically with respect to the longitudinal axis of the shoe. Thus, in the diagonal arrangement of the contact members according to FIG. 9, the two parts of the dividing line come to lie in a similar manner with regard to the edge of the chain conveyor as in the embodiment according to FIG. 5. Also, since the displacement of the shoe 100 takes place in the diagonal direction, first of all it is immaterial for establishing or terminating the frictional resistance whether the pallet 10 runs straight on the chain conveyors 14 and 16 or on chain conveyors 14a and 16a. Above all, the pairs of jointly actuated contact members for sections of the total conveying path extending perpendicularly to each other must be newly formed in each case, since contact members lying one behind the other in the conveying direction are actuated jointly, the others in phase opposition thereto.

Also provided on the sides of the pallet 10 are four power wheels 126, 128, 130 and 132, which travel respectively in pairs without sliding on the respectively used chain conveyors. Since the chain conveyors 14 and 16 in any case operate at different speeds, at any instant at least one of the power wheels is driven and the power required for adjusting the contact members can thus be derived from the movement of one of the chain conveyors, so that the pallet 10 does not need to carry its own power source therewith and also the stationary control means such as the cam rails 30 and 32 do not need to be designed for the transmission of high forces.

Figure 11:
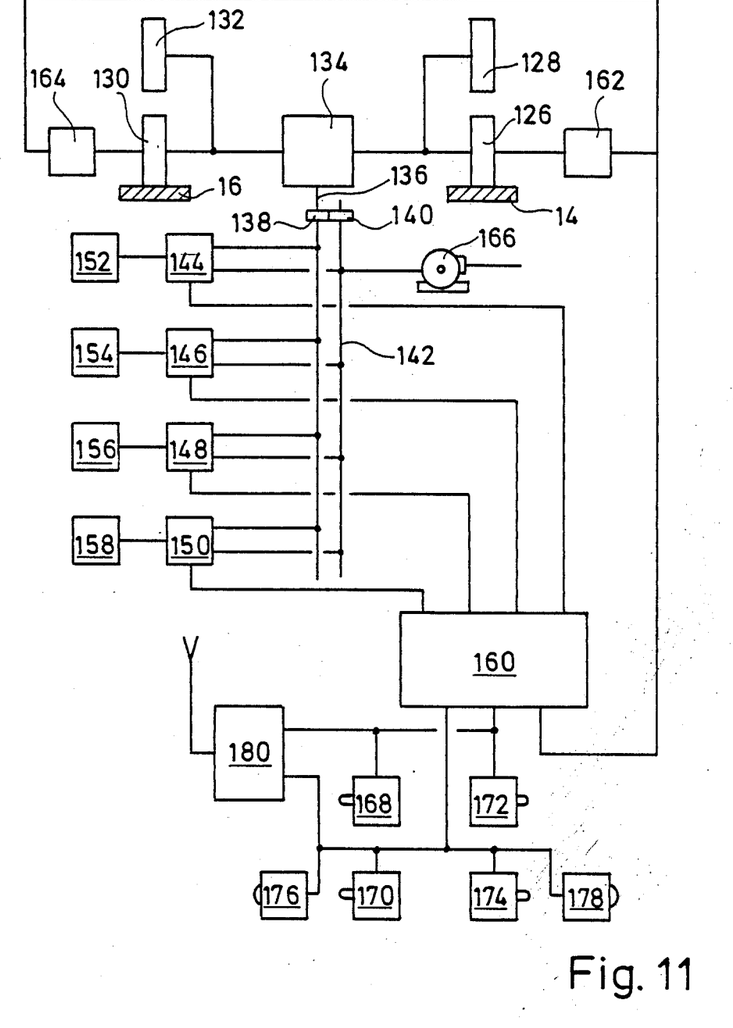
FIG. 11 is a mechanical and electrical block circuit diagram of the pallet shown in FIG. 9.

For the above-described purpose, the power wheels 126, 128 are connected to one of the input shafts of a differential gearing 134, as shown diagrammatically in FIG. 11. The power wheels 130 and 132 are connected to the other input shaft of the differential gearing 134.

By way of a pair of gears 138, 140, the output shaft 136 of the differential gearing 134 drives a second shaft 142, which thus rotates in the opposite direction. The shafts 136 and 142 are connected by way of change-over couplings 144 to 150 to regulating members 152 to 158 of the contact members 22 to 28. The control of the change-over couplings 144 to 150 is achieved by a control unit 160, the entirety being such that the regulating members 152 to 158 are not even moved in one or other direction.

The control unit 160 respectively energizes two of the change-over couplings 144 to 150 in the same direction. For this purpose, the control unit 160 must know whether the pairs of contact members to be dealt with at the same time are the contact members 22 and 24 as well as 26 and 28 or the pairs 24 and 28 as well as 22 and 26. This can be ascertained due to the fact that synchros 162, 164 are allocated to two opposite power wheels, in the embodiment in question the power wheels 126 and 130 and the output signals thereof are combined. If a combined signal is then obtained, this indicates that the pallet in FIG. 9 proceeds in the vertical direction; if no such signal is obtained, the pallet 10 in FIG. 9 moves in the horizontal direction.

Also connected to the shaft 142 is a small d.c. generator 166, which supplies the electrical power necessary for operating the control unit 160.

FIGS. 9 and 11 also show control sensors 168 to 174, which co-operate with actuating means integral with the frame. The control sensors 168 to 174 may be either mechanically actuated switches, proximity detectors or optical sensors. The sensors 168 and 172 serve to adjust the high conveying speed, the sensor 168 being active in the case of movement on the chain conveyors 14 and 16 and the sensor 172 being active in the case of movement on the chain conveyors 14a and 16a. Accordingly, the control sensors 170 and 174 serve to adjust the low conveying speed in the vertical or horizontal direction of movement of FIG. 9.

Additionally, the pallet 10 is equipped with proximity detectors 176, 178, which in the embodiment under consideration operate like the control sensors 170, 174, thus adjust the low speed. However, the proximity detectors 176, 178 may also be connected to a separate input of the control unit 160 and the latter can be designed such that upon the appearance of a signal from the proximity detectors 176, 178, all the contact members 22 to 28 are switched to low frictional connection to the chain conveyors located therebelow, so that the chain conveyors are able to travel substantially unimpeded below the pallet delayed against the obstacle.

When controlling the contact members 22 to 28 by a control unit 160, as just described, it is also possible to determine the changes in speed of the pallet 10 according to requirements independently of the displacement, in that a twin-channel receiver 180 is provided on the pallet 10. The output signals thereof then likewise serve for adjusting the high or low conveying speed of the pallets 10 and in this way it is possible to equalize quickly and simply accumulations or gaps in the succession of pallets resulting from disturbances.

The control unit 160 may also operate the couplings 144 to 150 in a pulsed manner, so that the displacement of the movable parts of the contact members 22 to 28 takes place in small steps. In this way, in contact members such as those illustrated in FIGS. 4 to 6 and 10, the extent of the frictional resistance between the contact member and conveying surface can be altered quasi continuously and thus one can also determine the acceleration characteristic when transferring from the movement at one constant speed to movement at the other constant speed.

Figure 12:
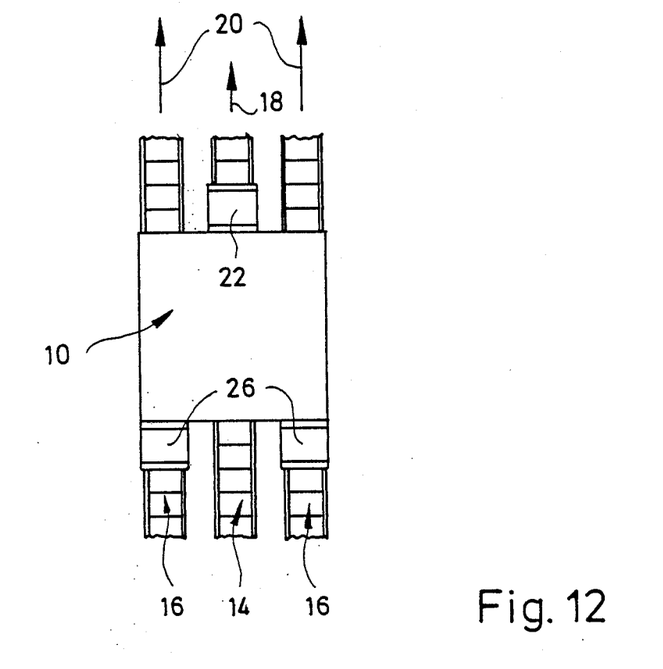
FIG. 12 is a plan view similar to FIG. 1 or FIG. 8, however three chain conveyors being provided for adjusting two different conveying speeds of the pallet.

FIG. 12 is a plan view of a similar conveying device to that shown in FIG. 8. However, only a single chain conveyor 14 is provided for the low conveying speed, whereas two chain conveyors 16 arranged symmetrically with respect to the central chain conveyor are provided for conveying at the high speed.

In the above-described embodiments of pallets, solely for the sake of greater clarity, the contact members were shown outside the edge contour of the main body of the pallet. It will be understood that in practice the contact members are located within this edge contour, in order that the pallet as a whole has a smooth-surfaced boundary.

Figure 13:
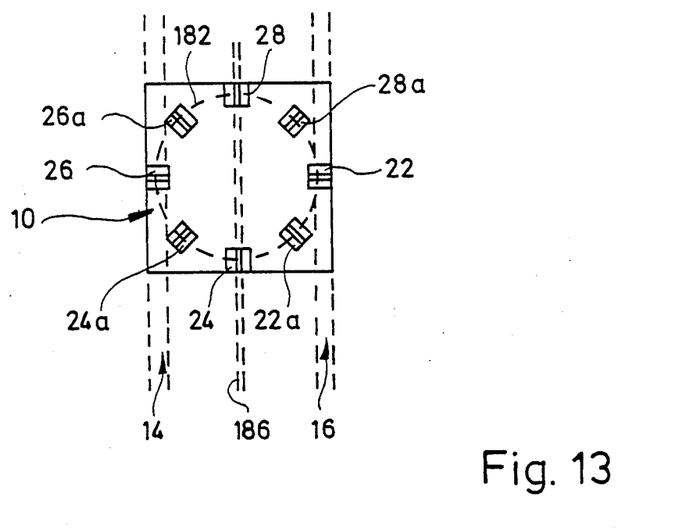
FIG. 13 is a plan view of the under side of a modified pallet able to be displaced in an angular direction.

In FIG. 13, which is a plan view of the under side of a pallet, the contact members are arranged accordingly, as in the pallet according to FIG. 9, this being a pallet which may travel in two directions running perpendicularly to each other, but in addition can also be conveyed in a position rotated through 45° with respect to the position illustrated in FIG. 13. For this purpose, the various contact members are located on a pitch circle 182. The set of contact members associated with the centres of the sides has exactly the same reference numerals as in FIG. 9; the set of contact members rotated through 45° and located on diagonals of the square pallet 10 also bears the letter a.

Figure 14:
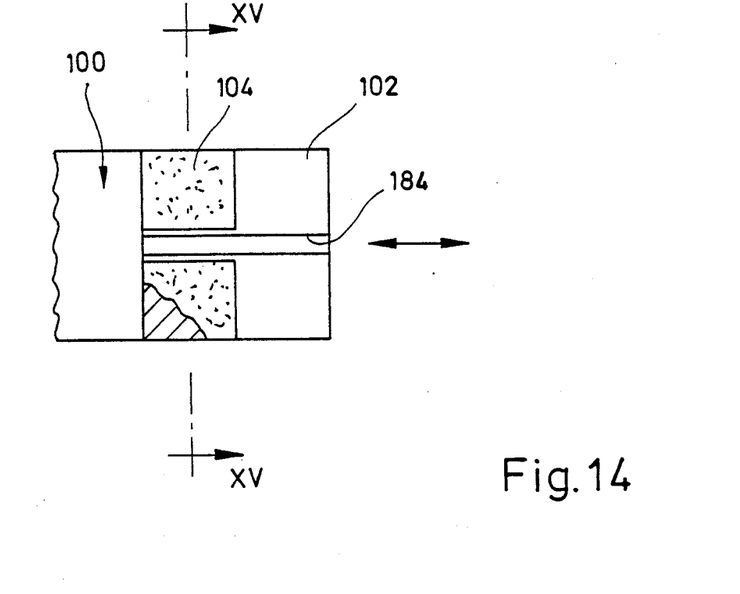
FIG. 14 is a plan view of the under side of a shoe of the contact members of the pallet according to FIG. 13.
Figure 15:
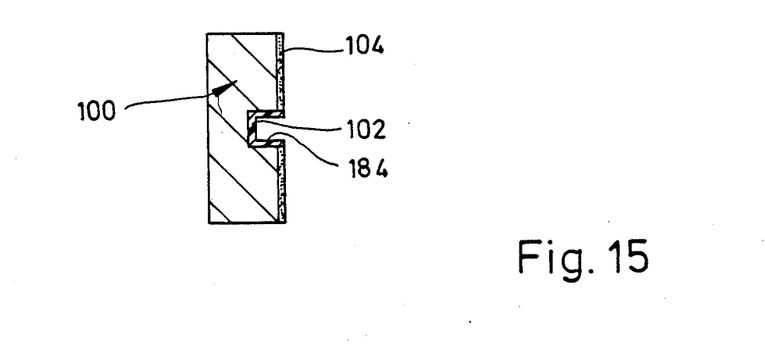
FIG. 15 is a cross-section through the shoe according to FIG. 14 on the section line XV—XV of this Figure.

As shown in FIGS. 14 and 15, the contact members each have a shoe 100 with a low friction covering 102 and a high friction covering 104. However, in addition, a central groove 184 extending in the adjusting direction is also provided on the shoes 100, which groove is likewise lined with low friction material on the base and on the side walls.

During operation, the contact members located at the side in the respective conveying direction travel on chain conveyors 14 and 16, whereas the front and rear contact members seen in the direction of movement travel by their groove 184 lined with sliding material on a support rail 186 raised above the conveying surface 78. In this way, the pallet 10 is supported in a non-tilting manner and at the same time it is guided laterally.

It will be seen that the pallet shown in FIG. 13 can travel not solely in the vertical direction, but also in the horizontal direction in the same way. The pallet can also travel offset by 45° in the vertical or horizontal direction.

The shifting of the pallet 10 through 45 or 90° or multiples or combinations of these angles is not solely an advantage with regard to conveyance along angular conveying paths; sometimes in a working station, a pallet is also rotated out of its original alignment by 45 or 90° or combinations of these angles, in order to place a certain surface of the work-piece opposite a tool. Frequently the same work-piece surface must again be located opposite a similarly located tool in a subsequent working station, so that the angular transposition of the pallet must take place twice. On the other hand, in the embodiment illustrated in FIG. 13, the pallet can be returned to the conveying device in this rotated alignment and supplied directly in this way to the next working station, so that two steps for rotating the pallets can be dispensed with.

In the above-described embodiments, the control of the frictional connection between the pallet and the chain conveyors travelling at different speeds was achieved by controlling coupling members, which were located on the pallet. The chain conveyors followed the desired conveying path exactly.

Figure 16:
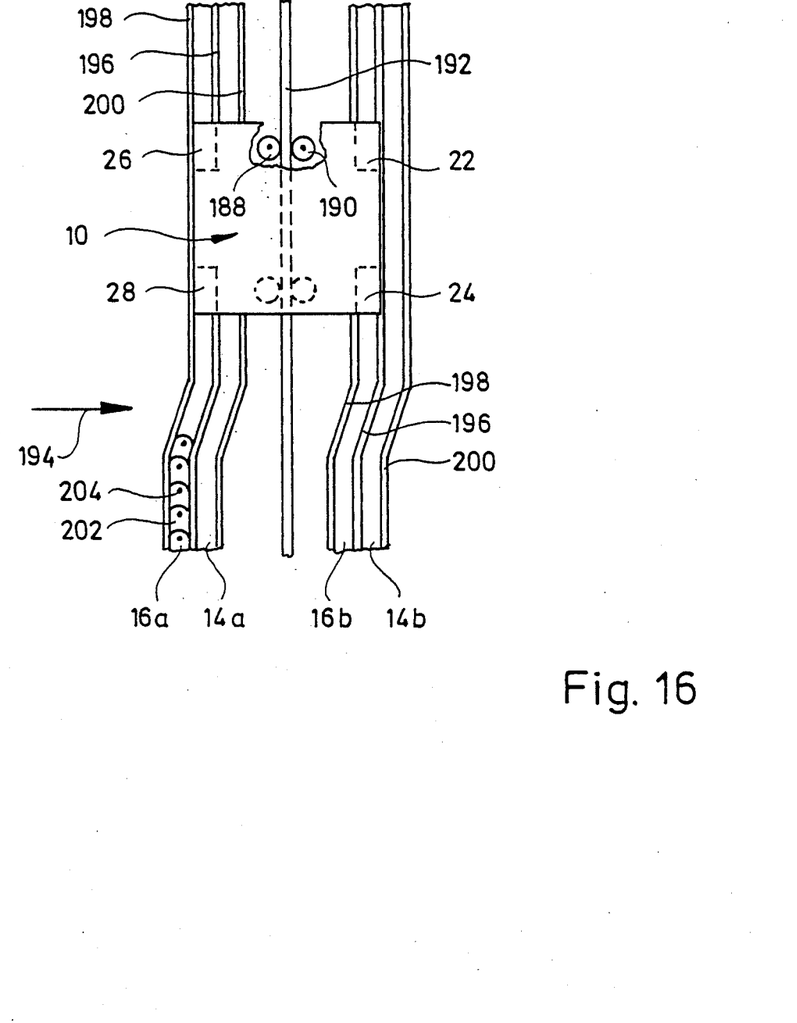
FIG. 16 is a plan view of a cutaway portion of a modified pallet-conveying device.

The control of the frictional connection between the pallet and chain conveyors can be implemented conversely due to the fact that fixed coupling members are provided on the pallets, which each co-operate with one of the chain conveyors and deflects the chain conveyors at certain points of the conveying path, transversely to the conveying direction, so that optionally one or other of the chain conveyors is in engagement with the coupling members of the pallet. FIG. 16 shows a corresponding embodiment.

The pallet 10 is provided at the front and rear ends with pairs of guide rollers 188, 190, which engage on the side faces of a guide rail 192. In this way the pallet 10 is guided transversely to the conveying direction. Provided on the under side of the pallet 10 are four contact members 22 to 28, which are constructed rigidly and by means of which the pallet rests in the position shown in FIG. 16 on chains 16a, 16b of a fast chain conveyor. A slower chain conveyor consists of two chains 14a and 14b, which in the position of the pallet shown in FIG. 16 travel freely below or beside the pallet 10.

At a point of the conveying path marked by an arrow 194, the chains 14a, 14b and 16a, 16b are shifted in the transverse direction so that now the chains 14a, 14b travelling slowly acquire the same transverse position as the chains 16a and 16b previously. At the arrow 194, in the conveying direction indicated in FIG. 16, the contact members 22 to 28 thus travel from the chains 14a, 14b to the chains 16a, 16b, which means that at this point the pallet 10 is accelerated from the lower speed to the high speed.

Adjacent pairs of chains 14a, 16a and 14b, 16b are separated from each other by a central guide plate 196, whereof the upper edge lies below the upper sides of the chains. The outer side of the chains 16a, 16b is in each case guided by a guide plate 198, the outside of the chains 14a, 14b is guided by a guide plate 200. These guide plates also have an upper edge located below the conveying plane defined by the chain conveyors.

In order to facilitate the transverse shifting of individual chain sections, the individual chains consist of chain links 202, which are pivotally connected to each other by vertical pins 204. The chain links 202 have a substantially prismatic shape, with the exception of their end face lying at the front or rear in the conveying direction, which are constructed as cylindrical surfaces coaxial to the pins 204.

The embodiment according to FIG. 16 is particularly suitable for those applications in which only a small number of changes of speed is required along the conveying path and a very high number of pallets is circulating. In this case, the pallets have a mechanically particularly simple and robust construction.

I claim:

1. Conveying device with at least two endless conveyors (14, 16) extending parallel to each other, which form a substantially closed conveying surface and with pallets (10), which rest by way of contact members (22 to 28) on the endless conveyors (14, 16), at least two of the endless conveyors (14, 16) travelling at different speeds and the frictional connection between the pallets (10) and the groups of endless conveyors (14, 16) travelling at different speeds being able to be controlled depending on the displacement, characterized in that the control of the frictional connection between the pallets (10) and the endless conveyors (14, 16) takes place by controlling the frictional connection between the contact members (22 to 28) of the pallets (10) and the conveying surfaces (78) of the endless conveyors (14, 16), this control taking place jointly for all the contact members (22 to 28) co-operating with one of the endless conveyors (14, 16) and in phase opposition for the various sets of contact members (22 to 28) associated respectively with one of the endless conveyors (14, 16).

2. Conveying device according to claim 1, characterized in that the contact members (22 to 28) each comprise wheels (40), which rotate about an axis (38) parallel to the conveying surface (78) and arranged perpendicularly to the conveying direction and controllable brakes (44, 46) acting on these wheels (40).

3. Conveying device according to claim 2, characterized by means (72; 56, 54) for the resilient and/or frictional locking of the brakes (44, 46) in their working position and their inoperative position.

4. Conveying device according to claim 1, characterized in that the contact members (22 to 28) each comprise wheels (88), which rotate about an axis (96) arranged perpendicularly to the conveying surface (78) and by adjusting means (90) for shifting the wheels (88) in the transverse direction of the endless conveyors (14, 16).

5. Conveying device according to claim 4, characterized in that the wheels (88) are seated on axle stubs (96) having a large diameter, whereof the lower end faces lie in the same plane as the lower end faces of the wheels (88).

6. Conveying device according to claim 1, characterised in that the contact members (22 to 28) comprise shoes (100), whereof the lower end face comprises sections of high friction (104) and low friction (102) lying one beside the other.

7. Conveying device according to claim 4, characterised in that the contact members (22 to 28) are located at the corners of a square and are able to move in directions which are inclined by 45° with respect to the axes of the pallets.

8. Conveying device according to claim 6, characterised in that the boundary line (124), which lies between the surface sections (102, 104) with low and high friction, has linear sections extending at right angles to each other, which each extend parallel to the axes of the pallet.

9. Conveying device according to claim 1, characterised in that the contact members (22 to 28) have a lower end face section (102) with low friction on the conveying surface (78) and located therebeside a roller (112), whereof the running axle extends parallel to the conveying surface (78) and perpendicularly to the conveying direction.

10. Conveying device according to claim 1, characterised in that the contact members (22 to 28) each comprise a wheel (118), whereof the running axle is adjustable perpendicularly to or parallel to the conveying direction in a plane parallel to the conveying surface (78).

11. Conveying device according to claim 1, characterised in that the pallets (10) on the endless conveyors (14, 16) comprise lateral power wheels (126 to 132) travelling in a non-slip manner, which are rotationally connected to two inputs of differential gearing (134), which in turn drives two drive shafts (136, 142) moving in opposite directions, which are connected by way of controllable couplings (144 to 150) to regulating means (152 to 158), which act on the movable parts of the contact members (22 to 28) controlling the frictional resistance.

12. Conveying device according to claim 11, characterised in that the pallets (10) comprise additional front and rear power wheels (128, 132), which are likewise connected rotationally to the two input shafts of the differential gearing (134).

13. Conveying device according to claim 12, characterised in that synchros (162, 164) co-operate with two of the power wheels (126 to 130) located opposite each other and the combined output signal of these two synchros is used to determine which of the contact members (22 to 28) are to be actuated jointly according to the respective direction of travel of the pallet (10).

14. Conveying device according to claim 11 characterised by a voltage generator (166) driven by the output of the differential gearing (134).

15. Conveying device according to claim 1 characterised by control sensors (168 to 174) supported by the pallets (10), which co-operate with actuating means integral with the frame, in order to attach the pallet (10) to the slower conveying means (14) or to the conveying means (16) travelling more quickly.

16. Conveying device according to claim 1, characterised by proximity detectors (176, 180), which by their response discontinue at least the frictional connection to the faster of the endless conveyors (14, 16), preferably the frictional connection of the pallet to all the endless conveyors.

17. Conveying device according to claim 1 characterised by radio-actuated control circuits (180) for the selective establishment of a frictional connection between the pallet (10) and the slower endless conveyor (14) or the faster endless conveyor (16).

18. Conveying device according to claim 1, characterised in that two high speed endless conveyors (16) are located laterally outside one or two low speed endless conveyors (14).

19. Conveying device according to claim 1, characterised in that the contact members are located within the inside edge contour of the pallets (10) on their under side.

20. Conveying device according to claim 19, characterised in that a plurality of contact members (22 to 28), preferably four or an integral multiple of four, are located in the peripheral direction regularly distributed on a common pitch circle (182).

21. Conveying device according to claim 20, characterised in that shoes (100) of the contact members (22 to 28) each comprise a groove (184), which extends in the radial direction of the pitch circle and slides with low friction on a support rail (186).

22. Conveying device according to claim 1, characterised in that the pallets (10) comprise fixed contact members (22 to 28) and are permanently guided in the direction perpendicular to the conveying direction (188 to 192) and that at predetermined points (194) of the conveying path, the endless conveyors (14, 16) comprise conveying sections extending in an inclined manner with respect to the pallet guide device (188 to 192) so that optionally one endless conveyor or the other endless conveyor aligns with the path travelled by the contact members (22 to 28).

23. Conveying device according to claim 22, characterised in that the endless conveyors (14, 16) comprise conveying chains (14a, 14b, 16a, 16b), which comprise conveying members (202) able to tilt about pins (204) perpendicular to the conveying plane, which conveying members, at least at the predetermined points (194) of the conveying path, travel between guide plates (196 to 200) engaging their side faces.

24. Conveying device according to claim 23, characterised in that the conveying members of the endless conveyors (14, 16) have a substantially cuboid-shaped outer contour, however, their end faces located at the front and rear in the conveying direction being constructed as cylindrical surfaces coaxial to the pivot pins.

* * * * *